INVENTORS
THOMAS H. EYLES and
EMILIO IACOBONI

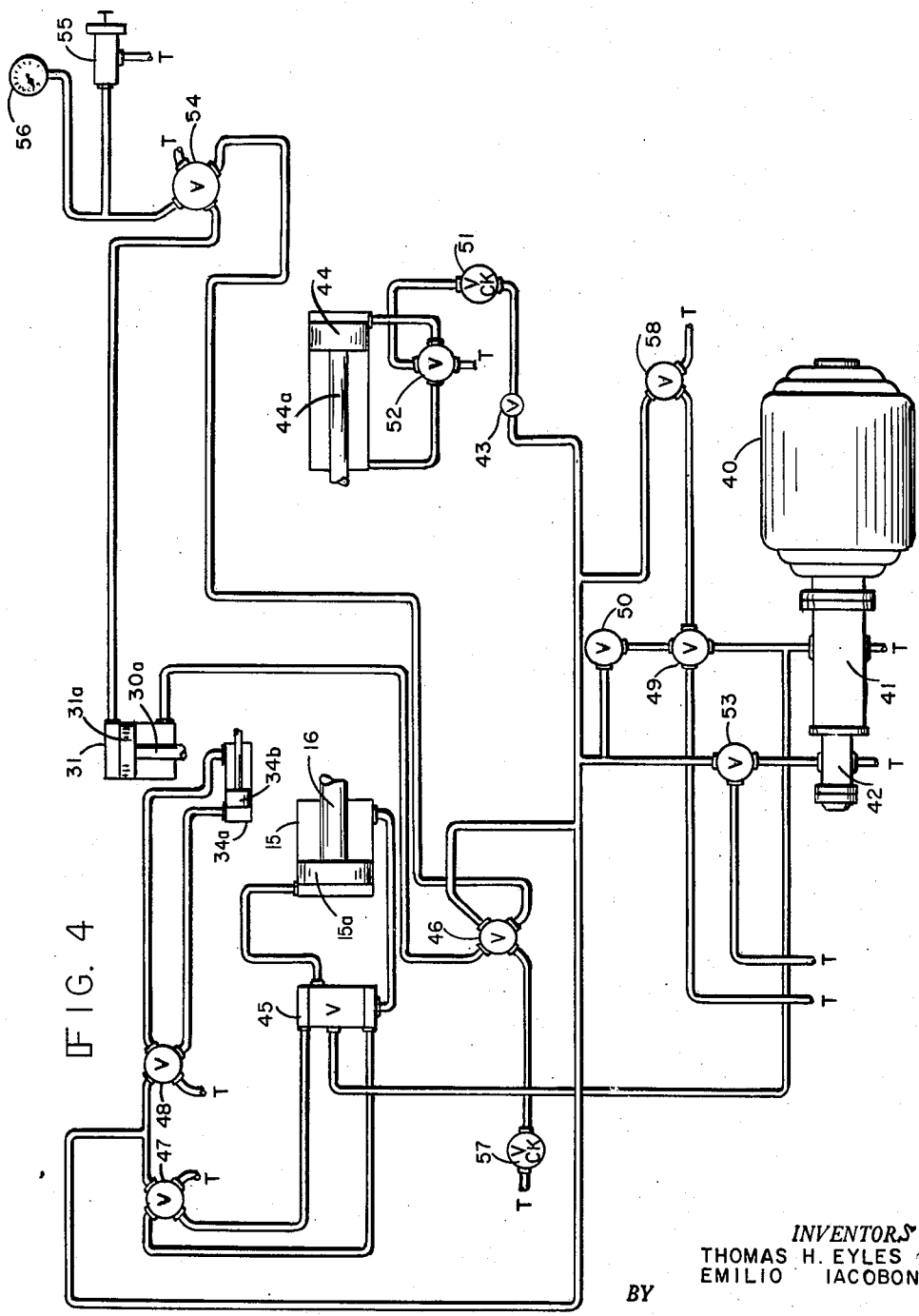

United States Patent Office 2,831,214
Patented Apr. 22, 1958

2,831,214

INJECTION MOLDING APPARATUS

Thomas H. Eyles and Emilio Iacoboni, Leominster, Mass., assignors to Foster Grant Co., Inc., Leominster, Mass., a corporation of Massachusetts Application January 12, 1956, Serial No. 558,709

4 Claims. (Cl. 18—30)

This invention relates to injection molding apparatus. In particular it relates to an improved injection molding machine for rapid and economical injection molding of plastic articles of uniform density, free from entrapped air, and of a low reject percentage.

Injection molding is generally carried on with a powdered resin as the starting material. The powdered resin is delivered under mechanical pressure to a heating zone in which the resin changes from a powder to a fluid. It is this fluid which is forced into the mold cavity to form the desired object upon cooling. In changing from a powder to a fluid an injection molding powder undergoes both a decrease in resistance to flow and a change in volume. Further, due to the low heat conductivity of most injection molding materials it is difficult to obtain uniform heating with the result that both air and unmelted particles are often dispersed in the final molded product. The presence, even in small quantity, of such unmelted granules, air pockets and partially melted granules, impairs both the appearance and mechanical strength of molded articles. These irregularities are of particular importance in the molding of transparent objects.

Various attempts have been made to overcome the above-stated problems. Machines have been provided with rams of great pressure to drive powdered resin through a heating zone having a large surface, the molten plastic being then passed into the mold. However, it has been shown that regardless of the mass of the ram and the pressure behind it and regardless of the surface area of the heating zone that a single ram device produces a significant percentage of articles having occluded air and discrete particles of resin. Further, the single ram machines are slow since the ram must go through a complete reciprocal cycle for each shot delivered to the mold.

Machines have been described which attempt to overcome the disadvantages of the single ram machine by having the ram load a second heated chamber instead of injecting directly into the mold. A second ram is generally provided in the second heated chamber for accomplishing injection into the mold. However, such two-ram machines as have been described are expensive to construct and maintain, intricate to operate and are generally not suitable for the preparation of transparent uniform density articles free from entrapped air and discrete resin particles.

One object of this invention is to provide an improved and simplified injection molding apparatus for rapid molding at lower injection pressure of compact plastic articles of uniform density, free from entrapped air and discrete resin particles, and of low reject percentage.

A further object of this invention is to provide an apparatus for economic and rapid injection molding of plastic articles having an insignificant percentage of internal strains or fissures. Still another object of this invention is to provide an injection molding machine as above which can yield transparent molded articles of exceptional clarity and substantially free from entrapped air, dispersed discrete resin particles, fissures and internal strains.

Other objects and advantages of this invention will be apparent from the description and drawings which follow, in which drawings:

Figure 4 is a schematic diagram of the hydraulic and control circuit associated with the machine in Figure 1.

Figure 1:
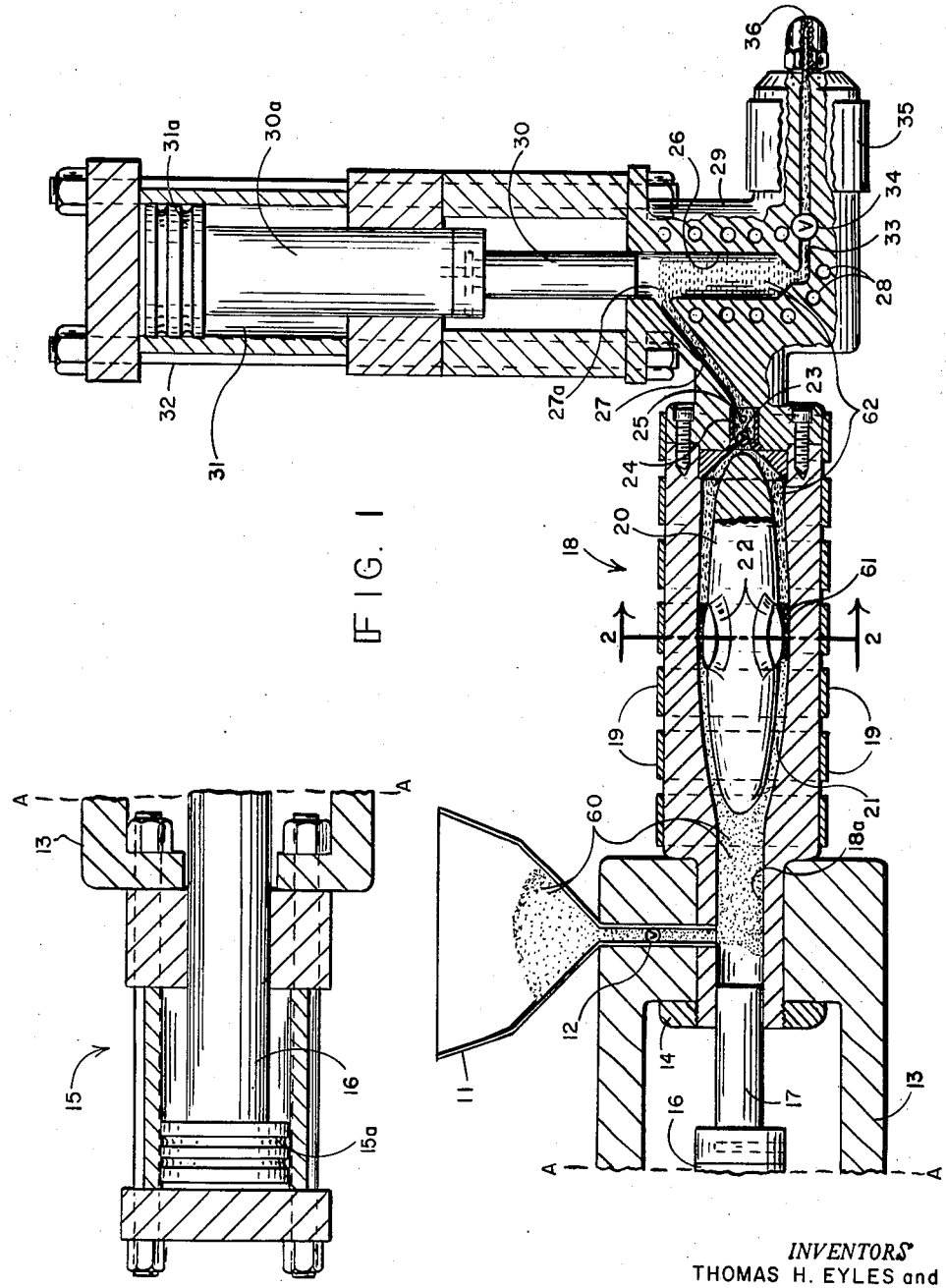
Figure 1 is a longitudinal vertical cross-section of a specific embodiment of this invention.
Figure 2:
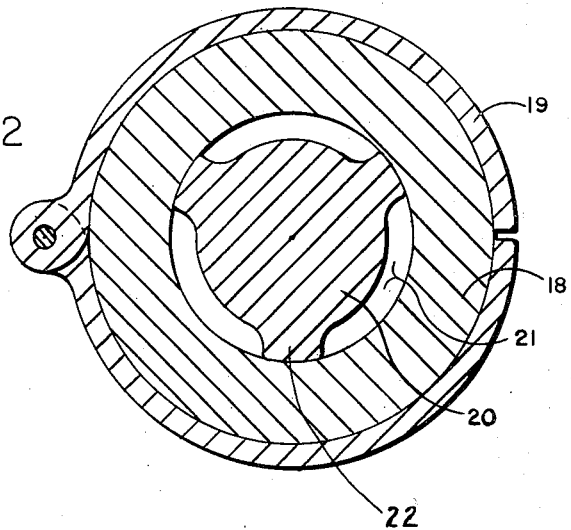
Figure 2 is a transverse section taken along line 2—2 of Figure 1.
Figure 3:
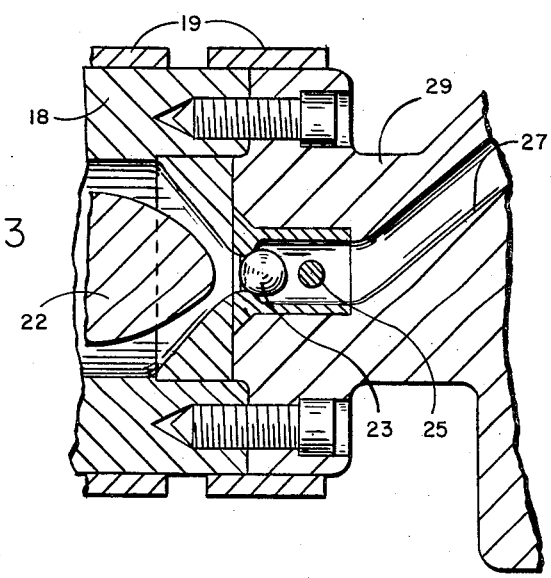
Figure 3 is an enlargement of a portion of Figure 1.

As shown in the longitudinal section of Figure 1, the improved machine of this invention comprises generally an extended longitudinal horizontal frame 13 supporting at one end a hydraulic cylinder 15 in which an hydraulic ram 15a is reciprocally movable. Connected to ram 15a is a fixed rod 16 which is terminated by the loading ram 17, ram 17 being reciprocably movable in a filling chamber 18a. Mounted directly above and connecting with chamber 18a is a hopper 11 with a volumetric control 12. The chambers 15 and 18a are separate and apart but are aligned. Ram 15a, rod 16 and ram 17 are effectively a single unit so that movement of ram 15a in its hydraulic cylinder causes like movement of ram 17 in the filling chamber 18a. Hydraulic cylinder 15 is provided with hydraulic connections and controls indicated in Figure 4.

Chamber 18a is formed as an integral part of a heating block 18 and communicates with a solid spreader 20, which, supported by sections 22, forms spreader passages 21 around the spreader 20. Heating block 18 is provided with electrical heating strips 19 so that molding powder 60 moving from chamber 18a to spreader passages 21 is heated and gradually converted from a solid to a fluid. Generally at point 61 there is a mixture of fluid and powder while at point 62 the material is substantially liquid. The annular spreader passage 21 converges to a horizontal tubular conduit 24, in which is positioned a one-way ball valve 23 with an associated stop pin 25, leading into an upwardly inclined conduit 27. Conduit 27 is formed from an integral base block 29 attached to heating block 18.

The integral base block 29 supports a vertical tie-bar frame 32 which contains a vertical hydraulic cylinder 31. Within cylinder 31 is positioned a hydraulic ram 31a reciprocally movable within cylinder 31 and aligned and connected by piston rod 30a to vertical injecting ram 30. Injecting ram 30 is movable within a chamber 26 formed from base block 29. Ram 30 has sufficient clearance in chamber 26 so as to provide means for escape of air upwardly when sufficient pressure is exerted but not enough to allow any escape of fluid plastic. Action of ram 31a in hydraulic cylinder 31 causes similar action of ram 30 in cylinder 26. Inclined conduit 27 leads upwardly from valve 23 to an orifice 27a near the top of chamber 26 but below the uppermost point of cylinder 26 when ram 30 is in its highest vertical position. The lower portion of chamber 26 communicates with a horizontal conduit 33 leading to an injection orifice 36. Conduit 33 is likewise formed from the integral block 29. An hydraulically operated valve 34 is interposed in conduit 33. Throughout block 29 are spaced a plurality of electrical cartridge heaters 28. The nozzle side of block 29 is in the form of a protruding section covered with an electrical heating band 35. The injection orifice 36 is usually in contact with a fill or sprue bushing of an injection mold.

The general sequence of operations is as follows, with typical pressures that can be used:

When the mold platens are closed, ram 30 is driven downward at about 600 p. s. i. Simultaneously one-way valve 23 automatically cuts off flow of plastic into inclined conduit 27, and hydraulic valve 34 is opened so that the molten plastic material in chamber 26 is delivered to injection orifice 36 and hence into the closed mold. After ram 30 reaches its bottom position a holding pressure of about 400 p. s. i. is applied for a controlled period of time. Then hydraulic valve 34 is closed and ram 30 raised in chamber 26 to a position above the entrance of conduit 27 but not completely to its uppermost position. In this position ram 30 has a resistive pressure of 400 p. s. i. Ram 17 is then caused to push forward with a pressure of 1000 p. s. i. causing molten plastic material to go from the spreader passages 21 through one way valve 23 up inclined conduit 27 until it fills the space in chamber 26. After filling chamber 26 the pressure of ram 17 causes the plastic material to exert back pressure on ram 30 sufficient to force ram 30 into its uppermost position and simultaneously force out entrapped air. When ram 30 hits its uppermost position it stops its motion and ram 17 is then caused to recede.

The actuating and control elements for this sequence are described below.

In the hydraulic circuit (Figure 4) are illustrated the actuating and control elements and their relationships. The oil reservoir is not shown, but the pipe endings "T" all go into oil reservoir. The hydraulic system is always full. The motor 40 drives both a high pressure oil pump 42 and low pressure oil pump 41. The valves (v) are of several types. Valves 50, 51 and 57 are check valves. Valve 58 is a low pressure control needle valve, and valve 55 is an adjusting valve connected also with gage 56. Valve 49 is a low pressure valve while valve 43 is mechanically operated by the action of the closing of the safety bar in the mold section (not shown).

Valves 46 and 54 serve together to control oil pressure admitted to cylinder 31 and are operated by solenoids. Valve 46 is a three position valve having driving and return ports, one pressure feed, and one tank line, with a separate solenoid controlling each port. When neither solenoid is energized both ports are closed. Valve 54 is a two position control valve having two ports controlled by a single solenoid; the driving port reducing to 600 p. s. i., the return port reducing to 400 p. s. i. where the line pressure is 1000 p. s. i. A limit switch, actuated by the closing of the molds energizes the driving solenoid in valve 46 and the solenoid in valve 54 causing oil to be forced on top of hydraulic ram 31a. This causes the ram 31a to move and thus move injection ram 30 downwardly. This same limit switch also simultaneously energizes a solenoid controlling valve 48 so that hydraulic valve 34 is caused to be opened at the same time. Thus, the downward action of ram 30 will cause molten plastic to flow out through nozzle 36.

When ram 30 has moved to its lowest position it actuates another limit switch which energizes a time delay unit. This time delay unit is arranged so as to deenergize and thus reposition the solenoid in valve 54 so as to equalize pressure on the face and back of first ram 31a and thus hold the ram 31a in position for a fixed period of time. After this period is over, the time delay unit simultaneously deenergizes the solenoid in valve 48 causing hydraulic valve 34 to close, deenergizes the driving solenoid in valve 46, and energizes the return solenoid in valve 46, so that oil is now pumped in under ram 31a. This causes ram 30 to be lifted to a position above the orifice 27a but below its uppermost position in chamber 26. Movement to this position actuates a limit switch which both deenergizes the second solenoid in valve 46 so that there is now no difference in pressure on either side of ram 31a and also operates a solenoid in valve 47, and a first solenoid in four-way valve 45, causing flow of oil on the face of ram 15a. The result is that ram 17 is now moved forward in chamber 18a pushing plastic powder in front of it into the heating chamber 21 so that molten plastic 62 pushes open the one-way valve 23 and flows up inclined conduit 27 through orifice 27a into chamber 26. The oil pressure is maintained on ram 17 until the molten plastic 62 fills up the chamber 26 and exerts back pressure on ram 30. This exertion of back pressure forces entrapped air up the sides of ram 30 in chamber 26 to the atmosphere. The back pressure also forces oil out the oil exhaust T in valve 54. This back pressure phase also tends to compact and liquefy any dispersed resin particles giving a uniform homogeneous mass of molten plastic free from entrapped air and dispersed resin particles. As this back pressure on ram 30 builds up it forces ram 30 upward to its top position until a limit switch is actuated deenergizing the first solenoid in valve 45 and the solenoid in valve 47, stopping the forward flow of oil in front of ram 15 and thus halting the motion of ram 17. The switch simultaneously energizes the second solenoid in valve 45 which now causes oil to be forced against the back of ram 15. This causes the ram 17 to retract until the solenoid is deenergized by the ram 17 tripping a limit switch when it is in its full retracted position.

The molds, which are not illustrated, can be arranged so as to be opened or closed by hydraulic ram 44 in cylinder 44a, as controlled by solenoid-operated valve 52. Valve 52 can be arranged so that both its closing and opening are controlled by a manual switch or automatically. In either case, the closing of the molds, after removal of a previously molded object, is the action which both operates the limit switch simultaneously energizing the driving solenoid in valve 46, the solenoid in valve 54, and the solenoid controlling valve 48, and mechanically shuts off safety by-pass valve 43.

Although the preferred embodiment described above denotes a horizontal loading ram assembly-heating chamber with a vertical injection ram, the invention is not limited to a particular position with relation to the floor. If space requirements dictate other positions with relation to the floor, certain obvious modifications might be made in the hopper leading into the receiving chamber if gravity feed were to be used. Otherwise the system is totally closed and under pressure, and would work similarly in any position with relation to the floor.

The above embodiment describes a complete apparatus. However, the invention can also be generally used as a modifying unit for injection molding machines of the type having sequentially aligned double-acting ram assembly (e. g. 15—15a—16—17—18a); heating chamber e. g. 18) and nozzle (e. g. 36) by inserting block 29 and its contents and appendages between the nozzle and heating block, and modifying the hydraulic system to substantially conform with Figure 4.

In the appended claims the terms "horizontal," "upwardly," "top," "bottom," and "vertically" are used in a relative sense to one another.

The term "air" as used in the specification and appended claims is intended to include other vapors that may be present or produced during the process of injection molding, such as water, and gases of decomposition of the plastic material.

We claim:

1. An improved injection molding apparatus comprising a horizontal molding powder receiving chamber opening into one end of an aligned horizontal heating chamber, a heated block containing a vertical injecting chamber, an upwardly inclined filling conduit connecting the other end of said heating chamber to an orifice located below the top of said injecting chamber and a horizontal injection conduit connecting the bottom of said injecting chamber to an injection nozzle, a double-acting hydraulically operated loading ram horizontally movable in said receiving chamber, a double-acting hydraulically operated injection ram vertically movable in said injecting chamber and positioned so as to allow escape of air along its sides upwardly from said injecting chamber, an automatic flow controlled valve positioned in said filling conduit said valve being open when there is a flow of plastic from said heating chamber to filling conduit, and closed when said vertical injection ram starts its down stroke, an hydraulically operated injection valve positioned in said injection conduit, and hydraulic control means.

2. An improved injection molding apparatus comprising a horizontal molding powder receiving chamber opening into one end of an aligned horizontal heating chamber containing a spreader, an integral heated block containing a vertical injecting chamber, an upwardly inclined filling conduit connecting the other end of said heating chamber to an orifice located below the top of said injecting chamber and a horizontal injection conduit connecting the bottom of said injecting chamber to an injection nozzle, a double-acting hydraulically operated loading ram horizontally movable in said receiving chamber, a double-acting hydraulically operated injection ram vertically movable in said injecting chamber and positioned so as to allow escape of air along its sides upwardly from said injecting chamber, an automatic flow controlled valve positioned in said filling conduit, said valve being open when there is flow of plastic from said heating chamber to said filling conduit, and closed when said vertical injection ram starts its down stroke, an hydraulically operated injection valve positioned in said injection conduit, and control means including means for positioning said vertical ram above said orifice but below its top position and then driving plastic through said filling conduit into said vertical chamber until the pressure of the plastic forces said vertical ram into its top position.

3. A modifying unit for an injection molding apparatus of the sort comprising sequentially aligned horizontal receiving chamber, horizontal heating chamber, and injection nozzle, consisting of an integral heated block inserted between said heating chamber and said nozzle, and a cooperative double-acting hydraulically operated vertical ram supported by said block; said block containing a vertical injecting chamber in which said ram is movable, an upwardly inclined filling conduit connecting such heating chamber to an orifice located below the top of said injecting chamber, a horizontal injection conduit connecting the bottom of said injecting chamber to said injection nozzle, an automatic flow controlled valve positioned in said filling conduit said valve being open when there is flow from said heating chamber to said filling conduit and closed when said vertical injection ram starts its down stroke, and an hydraulically operated injection valve positioned in said injection conduit.

4. Claim 1 wherein said hydraulic control means includes means for sequentially causing said hydraulic valve to open and vertical ram to push downward, causing said vertical ram to maintain its lowermost position, causing said hydraulic valve to close and said vertical ram to rise and be positioned above said orifice but below its top position, causing said horizontal ram to move towards said vertical chamber until the pressure of the plastic force said vertical ram into its top position, and causing said horizontal ram to return to its original position.

References Cited in the file of this patent

UNITED STATES PATENTS

| | | |
|---|---|---|
| 2,668,986 | Miler | Feb. 16, 1954 |
| 2,737,686 | Harkenrider | Mar. 13, 1956 |